(12) United States Patent
Clarke

(10) Patent No.: US 7,175,516 B2
(45) Date of Patent: Feb. 13, 2007

(54) POULTRY PROCESSING HUB AND BELT ASSEMBLY

(75) Inventor: Robert Clarke, Rogers, AR (US)

(73) Assignee: Memco, Hollister, MO (US)

( * ) Notice: Subject to any disclaimer, the term of this patent is extended or adjusted under 35 U.S.C. 154(b) by 0 days.

(21) Appl. No.: 10/346,257

(22) Filed: Jan. 17, 2003

(65) Prior Publication Data

US 2003/0139129 A1 Jul. 24, 2003

Related U.S. Application Data

(60) Provisional application No. 60/349,526, filed on Jan. 18, 2002.

(51) Int. Cl.
A22C 21/02 (2006.01)

(52) U.S. Cl. ........................................................ 452/83

(58) Field of Classification Search .................. 452/83, 452/86, 84, 71; 198/834, 474
See application file for complete search history.

(56) References Cited

U.S. PATENT DOCUMENTS

| 1,372,595 | A | * | 3/1921 | Bouda ........................ 452/83 |
| 2,638,623 | A | * | 5/1953 | Hanscom .................... 452/83 |
| 3,611,475 | A | | 10/1971 | Harben |
| 3,747,159 | A | * | 7/1973 | Harben, Jr. .................. 452/91 |
| 3,911,530 | A | * | 10/1975 | Kalfsbeek et al. ............ 452/83 |
| 4,508,062 | A | * | 4/1985 | Berry et al. ................. 119/846 |
| 4,675,943 | A | * | 6/1987 | Tabata ........................ 452/167 |
| 4,791,704 | A | * | 12/1988 | Chapman .................... 452/182 |
| 4,807,624 | A | * | 2/1989 | Gross et al. ................. 606/133 |
| 4,825,867 | A | * | 5/1989 | Gross et al. ................. 606/133 |
| 5,061,224 | A | * | 10/1991 | Stuhler ........................ 474/84 |
| 5,197,969 | A | * | 3/1993 | Visscher et al. ............ 606/133 |
| 5,273,149 | A | * | 12/1993 | Aldrich et al. .............. 194/205 |
| 5,344,360 | A | * | 9/1994 | Hazenbroek ................ 452/182 |
| 5,470,293 | A | * | 11/1995 | Schonenberger ............ 482/54 |
| 5,728,019 | A | * | 3/1998 | Becker et al. ................ 474/94 |
| 5,947,265 | A | * | 9/1999 | Merten et al. .............. 198/834 |
| 6,168,510 | B1 | * | 1/2001 | Ford ........................... 452/87 |
| 6,254,471 | B1 | * | 7/2001 | Meyn .......................... 452/177 |
| 6,547,659 | B1 | * | 4/2003 | Adachi et al. .............. 452/173 |
| 6,622,851 | B1 | * | 9/2003 | Wunscher ................. 198/626.2 |

FOREIGN PATENT DOCUMENTS

| FR | 2653302 | * 10/1989 |
| GB | 2 098 454 A | 11/1982 |
| HU | 1 521 504 A | 8/1978 |
| NL | 1 226 317 A | 3/1971 |

* cited by examiner

*Primary Examiner*—Thomas Price
(74) *Attorney, Agent, or Firm*—Lathrop & Gage, L.C.

(57) ABSTRACT

This invention relates to a hub and belt assembly for driving a poultry de-feathering machine and more particularly to a multiple bearing heat dissipating hub driven by a serrated timing belt. The hub assembly incorporates seals along a drive shaft to reduce wear caused by dirt. The timing belt synchronizes multiple picking hubs and reduces the friction driving required. The combination of a heat dissipating hub and the placement of seals along the drive shaft within the hub minimize maintenance and replacement.

16 Claims, 4 Drawing Sheets

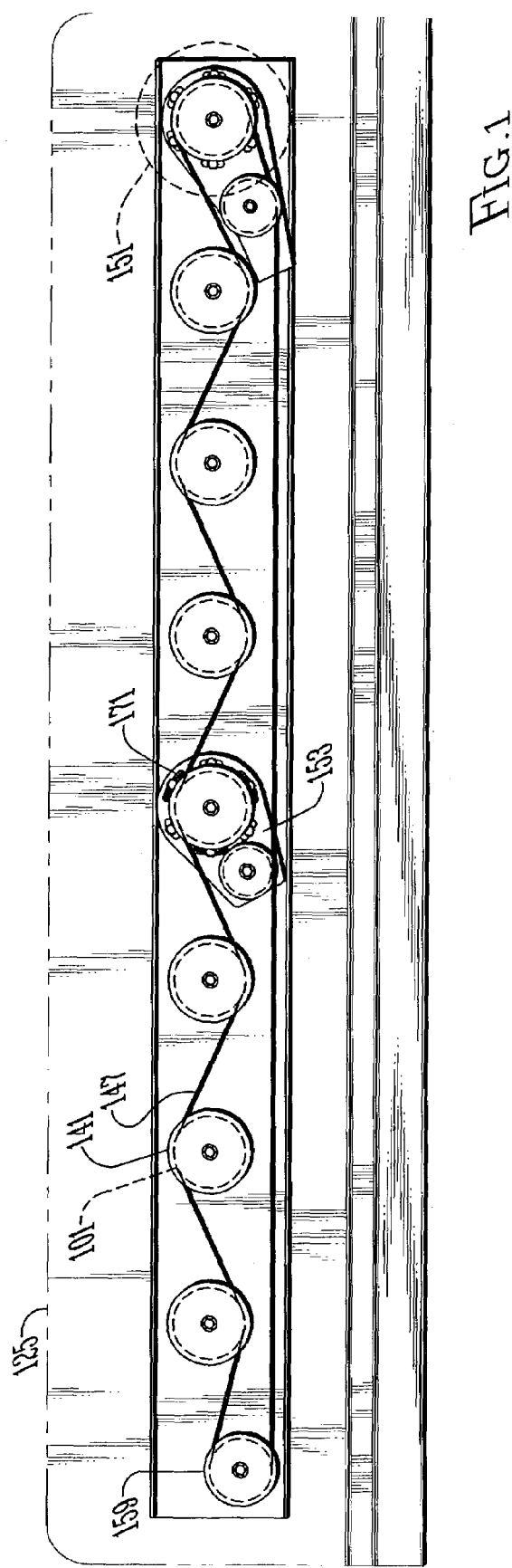

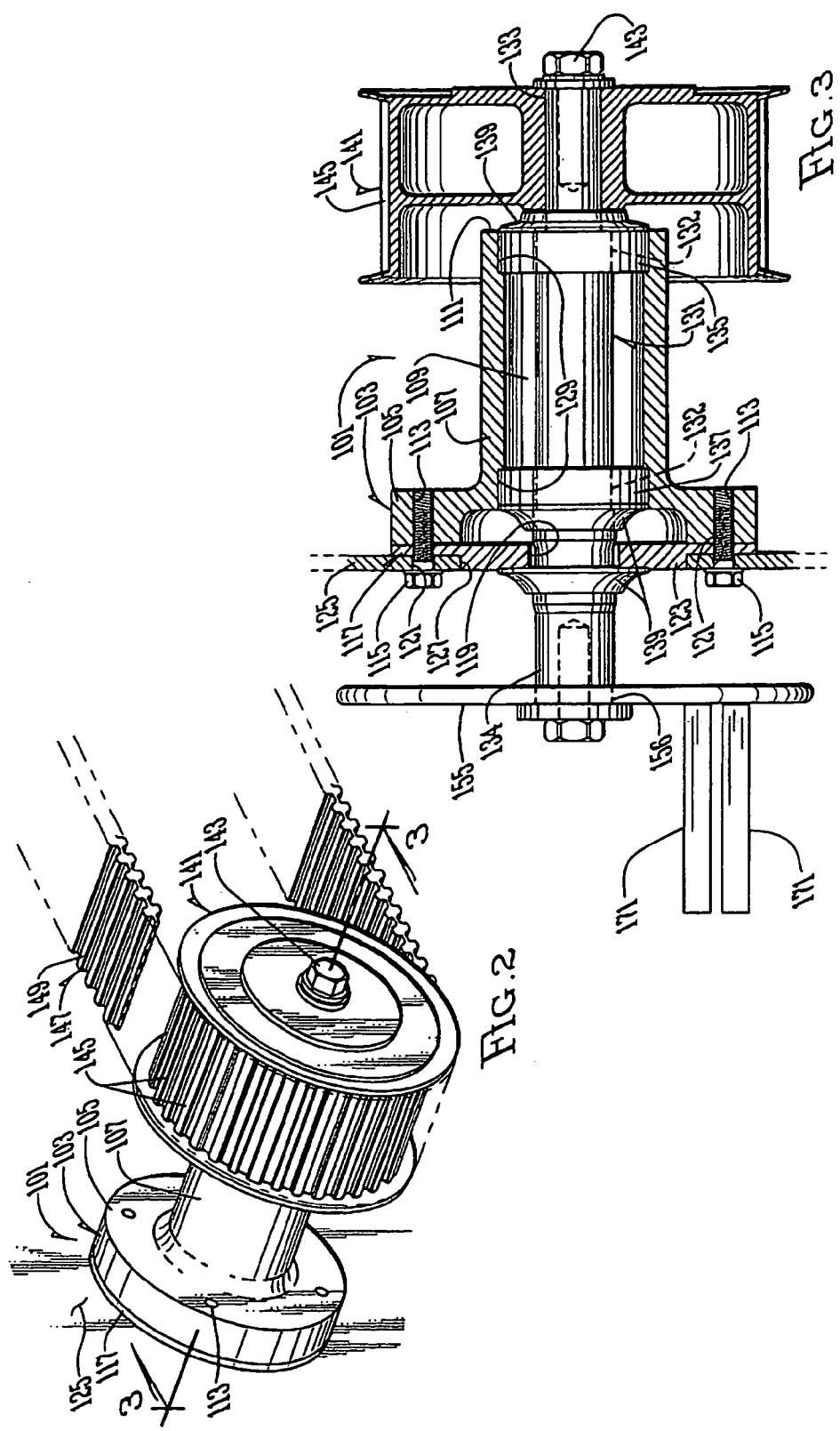

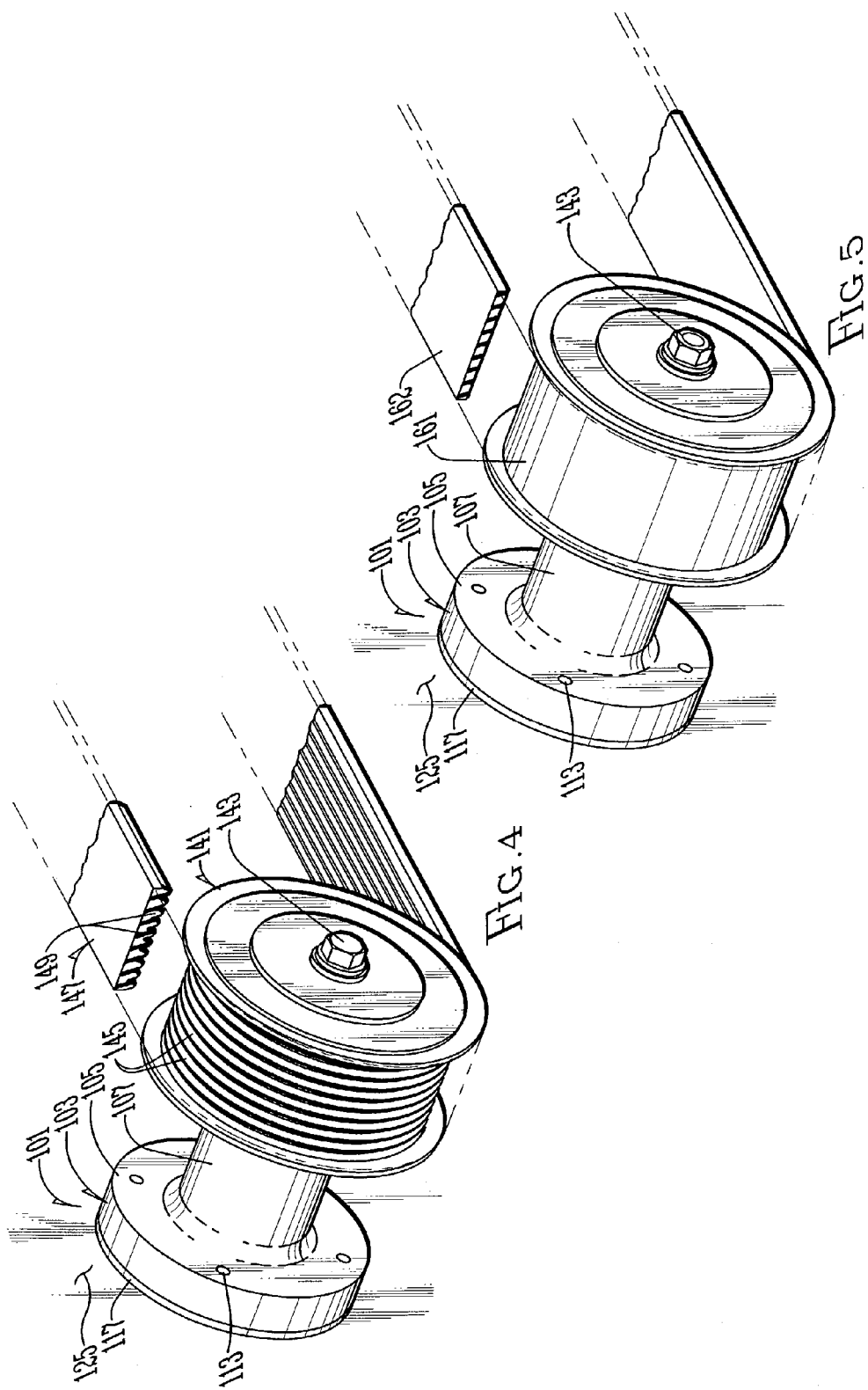

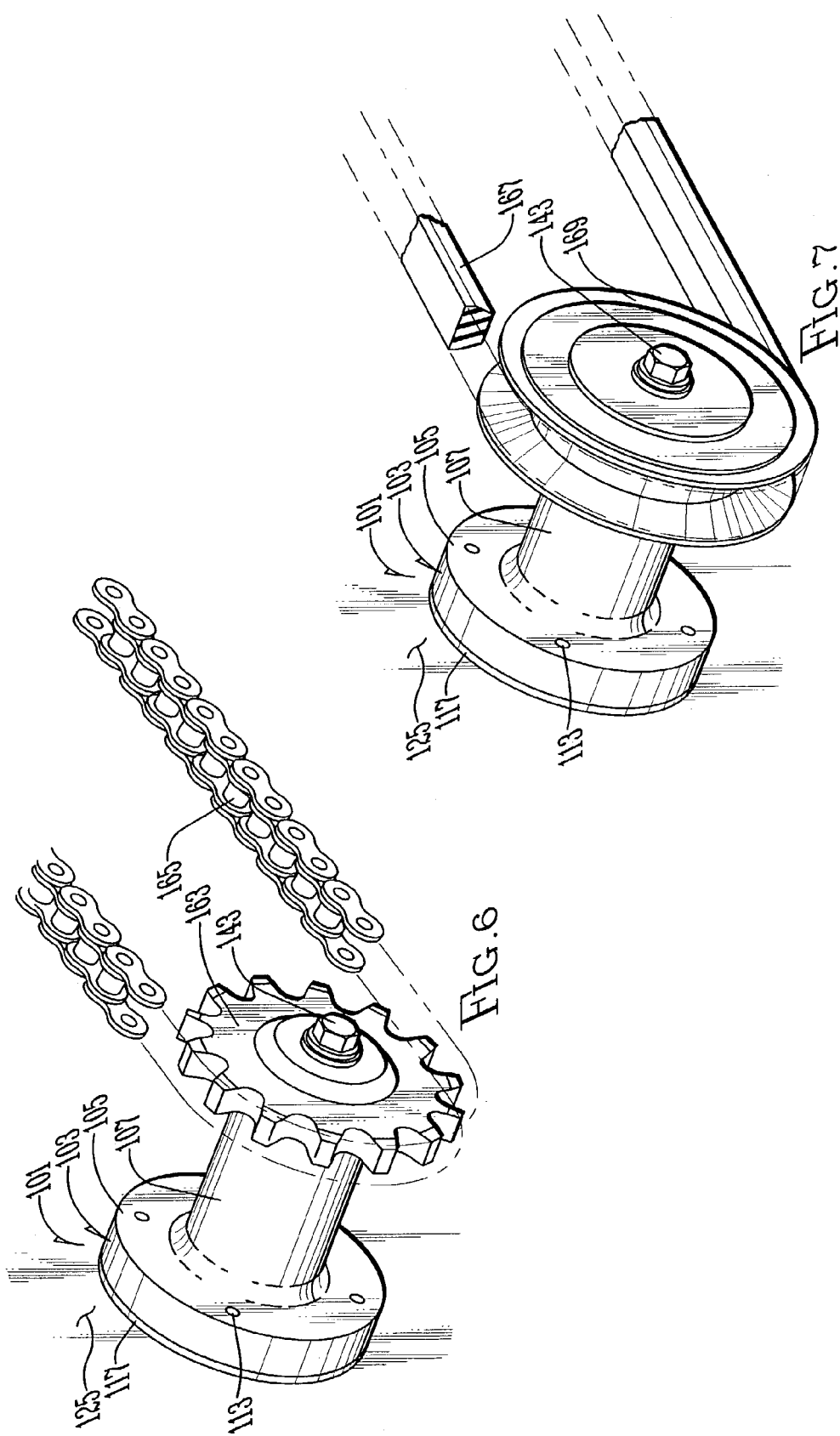

POULTRY PROCESSING HUB AND BELT ASSEMBLY

CROSS-REFERENCE TO RELATED APPLICATION

This application claims the benefit of the following provisional application: U.S. Ser. No. 60/349,526, filed Jan. 18, 2002, under 35 USC 119(e)(i).

FIELD OF INVENTION

The present invention relates to the field of poultry processing equipment, particularly rotational hub and belt assemblies for de-feathering or plucking devices.

BACKGROUND OF THE ART

Poultry processing industries commonly use automated lines to kill, eviscerate, pluck and further process birds. Rotational devices are generally employed to facilitate continuity of process and to minimize labor. One of the most common poultry processing machines is a plucker or de-featherer. For many years devices incorporating a number of pliable fingers have been utilized to beat and pull the feathers from bird carcasses.

In processing facilities, multiple finger-type plucking devices are used in sequence to fully pluck a carcass. Typical plucking processes incorporate opposing pairs of finger-typed pluckers which are sufficiently spaced apart to maneuver a bird carcass therebetween. Initial plucking is completed with a pair of spaced-apart finger-type pluckers having a plurality of rigid, spaced-apart fingers. Subsequent plucking of fine feathers is accomplished by passing the bird between opposed pairs of pluckers having multiple pliable fingers. Automated plucking devices are generally used to suspend and move the bird carcass along a line of opposed pairs of pluckers which depilate the carcass of all feathers from course to fine as the carcass travels along the processing line.

Typically, the pluckers of a processing line are powered by a motor which provides rotational force to each plucker via a chain or belt drive assembly. Early assemblies utilized a single motor connected to each plucker hub. This method facilitated accurate control of individual hub speed which is necessary to mesh opposing pairs of hubs and to synchronize sequential hubs. Due to the high cost of purchasing and maintaining individual motors, eventually hubs were spaced-apart in sequence so that a single motor could be used to drive multiple pluckers. Single drive hub assemblies eliminated multiple motors but had several inherent problems.

Either a V-belt or flat belt is used to transfer the rotational force from the motor to each sequentially aligned hub. Hub drives incorporate a smooth pulley commonly used for drive belt applications. The drive belts frequently have to be adjusted to maintain the desired, and necessary pressure and friction between the belt and pulleys to drive the multiple pickers. Problems exist in that the smooth belts stretch and constant maintenance and attention is required to control the drive force. Friction from belt slippage also accelerates wear and tear on hub assemblies, belts and motors.

Efforts to remediate the stated deficiencies resulted in a drive assembly which utilized drive chains and hub sprockets rather than belts and pulleys. This improvement resulted in constant and consistent force transferal from the drive source to the hub assemblies. However, it is common that the poultry being processed, or the shackles from which bird carcasses are suspended, become entangled or otherwise disrupt the plucker assembly. When, for instance, a shackle becomes entangled in single plucker, continual force of the drive source will cause the chain to shear the sprocket of that plucker. Further, problems in the plucking process can result in the jumping, or unwanted movement of the chain in relation to the sequence of hub gear assemblies. Often, hub gears are made of hardened plastic in an effort to minimize the cost incurred by shearing of sprocket teeth. These inexpensive systems are prone to failure and require significant maintenance due, in large part, to the intrusion of dirt, feathers and fecal matter into the moving parts.

Prior to Applicant's invention, the state of the art in the industry was either the "V" or flat belt technology, or the chain and gear assembly described above. Both of these assemblies require constant maintenance and adjustment. Because of belt slippage and the friction imparted on a hub assembly by the belt, hubs wear very quickly and must be rebuilt or replaced on a regular basis. Gear and chain drives require constant maintenance and because of shackle entanglement in pluckers result in the shearing of teeth from the sprocket. Further, Applicant's invention incorporates seals adjacent each bearing which significantly limits the intrusion of foreign matter into the workings of the hub assembly. The presence of the seals, along with the configuration of pulleys and belts, limits required maintenance and component replacement.

SUMMARY OF THE INVENTION

The present invention provides a poultry processing machine, particularly a hub and belt assembly such as a feather plucking device that facilitates timed rotation of driven members while diminishing wear and breakage commonly associated with such equipment. More particularly the device is a poultry processing apparatus which comprises a hub having a flange portion, a boss portion, a pulley end and a central bore extending therethrough. A hub plate, attachable to the hub, has a flange portion and a hub plate shaft bore alignable with the central bore of the hub. A drive shaft is mounted transversely through the central bore and hub plate shaft bore; the drive shaft further is provided with a pulley end and a spaced-apart drive end. A first bearing is positioned on the drive shaft at the hub plate and a second bearing is positioned on the drive shaft at the junction of the flange portion and boss portion. A seal is preferably positioned adjacent each bearing and at the hub plate to effectively prevent foreign matter from wearing the drive shaft and bearings.

A drive belt is operatively connected to a pulley fastened to the drive shaft at the pulley end and to a spaced-apart drive source. A poultry defeathering device, such as pliable rubber fingers, is attached to the drive shaft at the drive end and rotation of the drive belt about the pulley spins the drive shaft in the first bearing, second bearing and third bearing within the hub housing thereby operatively rotating the poultry de-feathering device.

Designed primarily for ganged sets of plucking arms, the hub and belt system utilizes a heat dissipating hub housing journalled to a drive shaft, preferably with at least two independent sealed bearings, and a timing belt which allows operators to alternate time opposed pairs of plucker arms to avoid entanglement of the process poultry, hangers and the plucking heads.

BRIEF DESCRIPTION OF THE DRAWINGS

FIG. 1 is a perspective side view of one embodiment of the inventive device.

FIG. 2 is a perspective view of one inventive hub assembly.

FIG. 3 is a sectional view of the inventive hub assembly taken along line 3 of FIG. 2.

FIG. 4 is a perspective view of another embodiment of the inventive hub assembly.

FIG. 5 is a perspective view of another embodiment of the inventive hub assembly.

FIG. 6 is a perspective view of yet another embodiment of the inventive hub assembly.

FIG. 7 is a perspective view of another embodiment of the inventive hub assembly.

DETAILED DESCRIPTION OF THE PREFERRED EMBODIMENT

The present invention provides an assembly for efficiently rotating a gang of poultry processing equipment. A preferred embodiment of a hub 101 and belt 147 assembly for rotating processing equipment is generally shown in FIG. 1.

Referring now to FIGS. 1, 2 and 3, the hub 101 of the present invention includes a hub housing 103 having a flange portion 105, a boss portion 107 projecting laterally from one side of the flange portion 105 terminating at a pulley end 111, and a central bore 109 extending through the flange 105 and boss 107 along the general axis of the hub. Generally, the flange portion 105 is provided with a plurality of circumferentially oriented mounting holes 113 for attaching the hub 101 to a machine cabinet 125 with screws or threaded bolts 115. A separate hub plate 117 is mountable to the hub housing 103 at the flange portion 105 opposite the boss portion 107. The hub plate 117 has a shaft bore 119 aligned with the central bore 109 and is further provided with a plurality of circumferentially oriented hub plate mounting holes 121 alignable with the mounting holes 113 of the flange portion 105. It is preferred that the hub housing 103 and hub plate 117 are manufactured of material which rapidly and efficiently dissipates heat such as aluminum.

Multiple outer bearing races 129 are formed within the central bore 109, preferably at the pulley end 111 of the boss portion 107, at the hub plate 117 attachment position and adjacent the junction of the flange portion 105 and boss portion 107. A drive shaft 131 is positioned through the central bore 109 of the hub 101 and the hub plate shaft bore 119. Multiple inner bearing races 132 are provided on the drive shaft 131 coincident with the outer bearing races 129 of the central bore 109 and the hub plate shaft bore 119. Sealed bearings 135 and 137 are fitted at each inner race 132 and outer race 129 thereby fastening the drive shaft 131 axially through the central bore 109 and hub plate shaft bore 119 while allowing the drive shaft 131 to freely rotate within the hub 101. It is preferred that a first bearing 135 is positioned at the pulley end 111 of the hub housing 103, a second bearing 137 positioned substantially near the junction of the flange portion 105 and boss portion 107. Additional bearing positions may be used depending on the size and application of the hub assembly.

Hub seals 139 are positioned on the drive shaft 131 adjacent each bearing 135 and 137. It is preferred that a seal 139 is also positioned adjacent the hub plate 117 to prevent dirt and debris from invading the juncture of the drive shaft 131 and the hub plate 117. The combination of three seals 139 provides a near hermetic seal which eliminates invasion of feathers, feather parts, dirt, fecal matter and the like into the hub assembly.

The separate hub plate 117 has an insert flange 123 which has an outer circumference equal to the circumference of a machine cabinet opening 127 where the hub 101 it to be attached. This insert flange 123 provides a loose seal between the hub 101 and the machine cabinet 125 and further diminishes vibration and wear common in rotating processing equipment. The placement of a seal 139 on the drive shaft 131 at the insert flange 123 will significantly limit internal wear caused by the dust, feathers and debris inherent with the depilating process.

A pulley 141 is fastened, via a pulley attachment device 143 at a pulley end 133 of the drive shaft 131 adjacent the pulley end 111 of the hub housing 103. The pulley 141 is provided with a plurality of spaced-apart timing serrations 145. A timing belt 147, which is provided with a plurality of spaced apart serrations 149 which mate to the pulley serrations 145, connects the drive shaft 131 to a drive mechanism 151. The use of the timing belt 147 and serrated pulley 141 eliminates belt slippage common with poultry processing equipment powered with a flat or V-shaped belt. A second type of timing belt 147, as shown in FIG. 4, may be used in place of the serrated belt.

As best shown in FIGS. 5 and 7, the pulley 141 can be exchanged with a common pulley for use of a flat or V-shaped belt if desired, or in necessary situations such as when a timing belt is not available. If preferred, a user can exchange the pulley 141 with a gear 163 which can be driven with a chain 165 as shown in FIG. 6. Therefore, while the preferred embodiment is described above, the instant invention provides a triple drive option because a user can drive the rotational device using a timing belt 147, flat 162 or V belt 167, or chain 165 by alternating the drive shaft 131 attachment with a serrated pulley 141, common "V", pulley 169 or flat pulley 161.

A finger plate bore 156 is formed in a drive end 134 of the drive shaft 131 opposite the pulley end 133. For a defeathering device, a finger plate 155 is bolted into the finger plate bore 156. The finger plate 155 can be provided with a plurality of plucking fingers, e.g., plucking finger 171, as is common in the industry.

As best shown in FIG. 1, the hub end belt assembly is suited to power a series of driven rotational defeatherers. The drive mechanism 151 and a belt return hub 159 are positioned at opposite ends of a series of substantially aligied hubs 101. A timing belt 147 encircles the drive mechanism 151 and return hub 159 and alternates above and below each sequential hub pulley 141. It is preferred that at least one spring-loaded tension arm and idler pulley 153 is provided at at least one hub 101 to independently release belt tension should the finger plate 155, or any part of the plucker assembly, become jammed.

The series of hub and belt assemblies preferably utilizes a timing belt having two sides, each side provided with spaced-apart protruding serrations, and wherein the belt is alternated above and below each of the aligned pulleys.

Additional variations and embodiments other than those specifically enumerated may be made to the hub and belt assembly without departing from the spirit and scope of the disclosed invention. Therefore, it is intended that the invention not be limited to this disclosed embodiment, but only by the scope of the appended claims.

What is claimed is:

1. A poultry processing apparatus comprising a plurality of spaced-apart hubs in substantial alignment, each hub journaled to a drive shaft, each drive shaft having a pulley end with a pulley attached thereto, and a drive end with a finger plate having a plurality of plucking fingers, the finger plate mechanically attached to the drive end thereto; a drive mechanism and a belt operatively connecting each pulley and the drive mechanism.

2. The poultry processing apparatus of claim 1 further comprising at least one tension idler arm.

3. The poultry processing apparatus of claim 1 wherein the belt is a timing belt having spaced-apart protruding serrations and each pulley is provided with spaced apart recessed serrations which mate with the protruding serrations of the timing belt.

4. The poultry processing apparatus of claim 3 wherein the timing belt has two sides, each side provided with spaced-apart protruding serrations, and wherein the belt is alternated above and below each of the aligned pulleys.

5. The poultry processing apparatus of claim 1 wherein each hub is journaled to a drive shaft with at least two independent sealed bearings.

6. The poultry processing apparatus of claim 1, further comprising a hub plate attached at an end of each hub, the drive shaft extending therethrough.

7. Poultry processing apparatus, comprising:
a plurality of spaced-apart hubs in substantial alignment, each hub having:
  a hub plate attached at an end of each hub, each hub plate having:
    an insert flare, and
    a seal adjacent the insert flare,
  a drive shaft journaled to each of the hubs with at least two independent sealed
    bearings, each drive shaft having:
    a pulley end with a pulley attached thereto, and
    a drive end with a finger plate having a plurality of plucking fingers, the finger plate mechanically attached to the drive end;
  a drive mechanism; and
a belt operatively connecting each pulley and the drive mechanism, wherein rotation of
  the belt about the pulleys spins the drive shaft to rotate the finger plate.

8. Poultry processing apparatus of claim 7, further comprising at least one tension idler arm for releasing tension on the belt.

9. Poultry processing apparatus of claim 7, wherein the belt is a timing belt having spaced-apart protruding serrations, and wherein each pulley forms spaced apart recessed serrations which mate with the protruding serrations of the timing belt.

10. Poultry processing apparatus of claim 9, wherein the timing belt has two sides, each of the sides forming spaced-apart protruding serrations, and wherein the belt is alternated above and below each of the aligned pulleys.

11. Poultry processing apparatus, comprising:
a plurality of spaced-apart hubs in substantial alignment, each of the hubs journaled to a drive shaft, each drive shaft having
  (a) a pulley end with a pulley attached thereto, the pulley forming spaced-apart recessions, and
  (b) a drive end with a finger plate having a plurality of plucking fingers, the finger plate mechanically attached to the drive end;
a drive mechanism; and
a belt forming spaced-apart protruding serrations on each side and alternating above and below each of the aligned pulleys,
wherein the belt serrations engage the pulley recessions and wherein rotation of the belt spins the pulleys to rotate the drive shaft and the finger plate.

12. The poultry processing apparatus of claim 11, further comprising a seal positioned adjacent each hub plate, for preventing dirt and debris from invading a juncture of the drive shaft and the hub plate.

13. Poultry processing apparatus of claim 11, the belt comprising a timing belt for alternately rotating time-opposed pairs of pulleys, to avoid entanglement of finger plates associated with the pulleys.

14. Poultry processing apparatus of claim 11, each hub comprising a central bore, further comprising at least two sealed bearings for rotatably securing the drive shaft axially through the central bore.

15. Poultry processing apparatus of claim 11, further comprising a hub plate attached at an end of each hub, for joining the hub to a machine cabinet.

16. Poultry processing apparatus of claim 15, further comprising a seal positioned adjacent each hub plate, for preventing dirt and debris from invading a juncture of the drive shaft and the hub plate.

* * * * *

UNITED STATES PATENT AND TRADEMARK OFFICE
CERTIFICATE OF CORRECTION

| | |
|---|---|
| PATENT NO. | : 7,175,516 B2 |
| APPLICATION NO. | : 10/346257 |
| DATED | : February 13, 2007 |
| INVENTOR(S) | : Robert Clarke |

It is certified that error appears in the above-identified patent and that said Letters Patent is hereby corrected as shown below:

Claim 7, column 5, line 29, change "flare" to --flange--;
Claim 7, column 5, line 30, change "flare" to --flange--.

Signed and Sealed this

Twenty-eighth Day of September, 2010

David J. Kappos
*Director of the United States Patent and Trademark Office*